United States Patent [19]

Freeman

[11] Patent Number: 5,054,566
[45] Date of Patent: Oct. 8, 1991

[54] WEIGHING SCALE WITH IMPROVED DAMPING OF OSCILLATIONS

[75] Inventor: Gerald C. Freeman, Norwalk, Conn.
[73] Assignee: Pitney Bowes Inc., Stamford, Conn.
[21] Appl. No.: 550,930
[22] Filed: Jul. 11, 1990
[51] Int. Cl.$^5$ .............................................. G01G 21/10
[52] U.S. Cl. ..................................................... 177/184
[58] Field of Search ......................... 177/184, 187, 189

[56] References Cited

U.S. PATENT DOCUMENTS 4,778,017 10/1988 Liang ................................... 177/187
4,802,541 2/1989 Bator et al. ...................... 177/189 X

*Primary Examiner*—George H. Miller, Jr.
*Attorney, Agent, or Firm*—Nathaniel Levin; Melvin J. Scolnick; Robert H. Whisker

[57] ABSTRACT

A weighing cell includes a base, with energy absorbing feet; a load cell supported by the base; a platform supporting member supported by the load cell; a platform for supporting an object to be weighed, the platform being supported by the supporting member; and damping material operatively positioned between the platform and the supporting member. The energy absorbing feet are chosen to substantially dampen the oscillations of a mass spring system consisting of a spring equivalent in total compliant effect to the load cell, the energy absorbing feet and the damping material and a mass equal to the combined mass of the heaviest object to be weighed and of the weighing cell and the damping material is chosen to substantially dampen the oscillations of a mass spring system consisting of a spring equivalent in total compliant effect to the load cell, the energy absorbing feet and the damping material and a mass equal to the combined mass of a relatively light object and of the weighing cell. A shorter scale response time is obtained.

9 Claims, 4 Drawing Sheets

WEIGHING SCALE WITH IMPROVED DAMPING OF OSCILLATIONS

FIELD OF THE INVENTION

This invention relates to a weighing cell with means for rapidly damping oscillations so that an accurate weight measurement may be quickly obtained.

BACKGROUND OF THE INVENTION

Weighing cells that comprise a load cell are well known. See, for example, U.S. Pat. No. 4,479,561, assigned to the assignee of this application, the disclosure of which is incorporated herein by reference.

Commonly, such weighing cells include a platform for receiving an item to be weighed. A structure is interposed between the platform and the load cell for applying to the load cell the load resulting from the item's weight. The load cell is mounted upon a further structure which underlies the load cell.

The load cell provides a signal that represents the item's weight. The signal is received and processed by a scale's electronic circuitry, which provides a numerical value representing the item's weight. The numerical value is then displayed and/or used in a calculation or for another purpose.

When an item is placed on the platform, the weighing cell tends to oscillate for a period of time. The oscillation affects the signal provided by the load cell and also affects the numerical value provided by the circuitry. An accurate value for the item's weight is difficult to obtain until the amplitude of the oscillation falls below a given level. This is particularly important for low frequency oscillations. The period of time between placement of an item on the platform and provision of an accurate numerical value representing the item's weight is known as the scale's response time. It is often desirable to reduce the response time, particularly when a large number of items are to be weighed in a short period. As discussed in U.S. Pat. No. 4,787,048 (assigned to the assignee of this application) prior approaches to this problem have included mechanical structure that returns to a stable state relatively quickly and mathematical/statistical techniques that attempt to predict the weighing cell's ultimate stable state. U.S. Pat. No. 4,787,048 discloses use of a numerical value obtained while the amplitude of the oscillation remains relatively large in those cases where use of a relatively less accurate value is acceptable. The above referenced U.S. Pat. No. 4,479,561 discloses a weighing cell with energy absorbing feet which improve a scale's response time. While these approaches have merit, further reductions in response time are desirable, especially when load cell scales are to be incorporated in systems that are desired to have high throughput rates.

SUMMARY OF THE INVENTION

A weighing cell in accordance with the invention includes a base; first damping material operatively positioned between the base and a mechanical ground; a load cell supported by the base; a structure for supporting a platform, that structure being supported by the load cell; a platform for supporting an object to be weighed, the platform being supported by the supporting structure; and second damping material operatively positioned between the platform and the supporting structure. The first damping material is chosen to substantially dampen the oscillation modes of a mass spring system consisting of a spring that is equivalent in compliant effect to the load cell and the first and second damping materials, and a mass equal to the combined mass of the heaviest object to be weighed and of the weighing cell and the second material is chosen to substantially dampen the oscillations of a mass spring system consisting of a spring equivalent in compliant effect to the load cell and the first and second damping materials and a mass equal to the combined mass of the weighing cell and of an object having a mass that is substantially less than the mass of the heaviest object to be weighed.

The weighing cell of this invention provides for an improved response time, especially in the weighing of items that are relatively light in relation to the cell's full capacity.

DETAILED DESCRIPTION OF THE PREFERRED EMBODIMENTS

Figure 1:
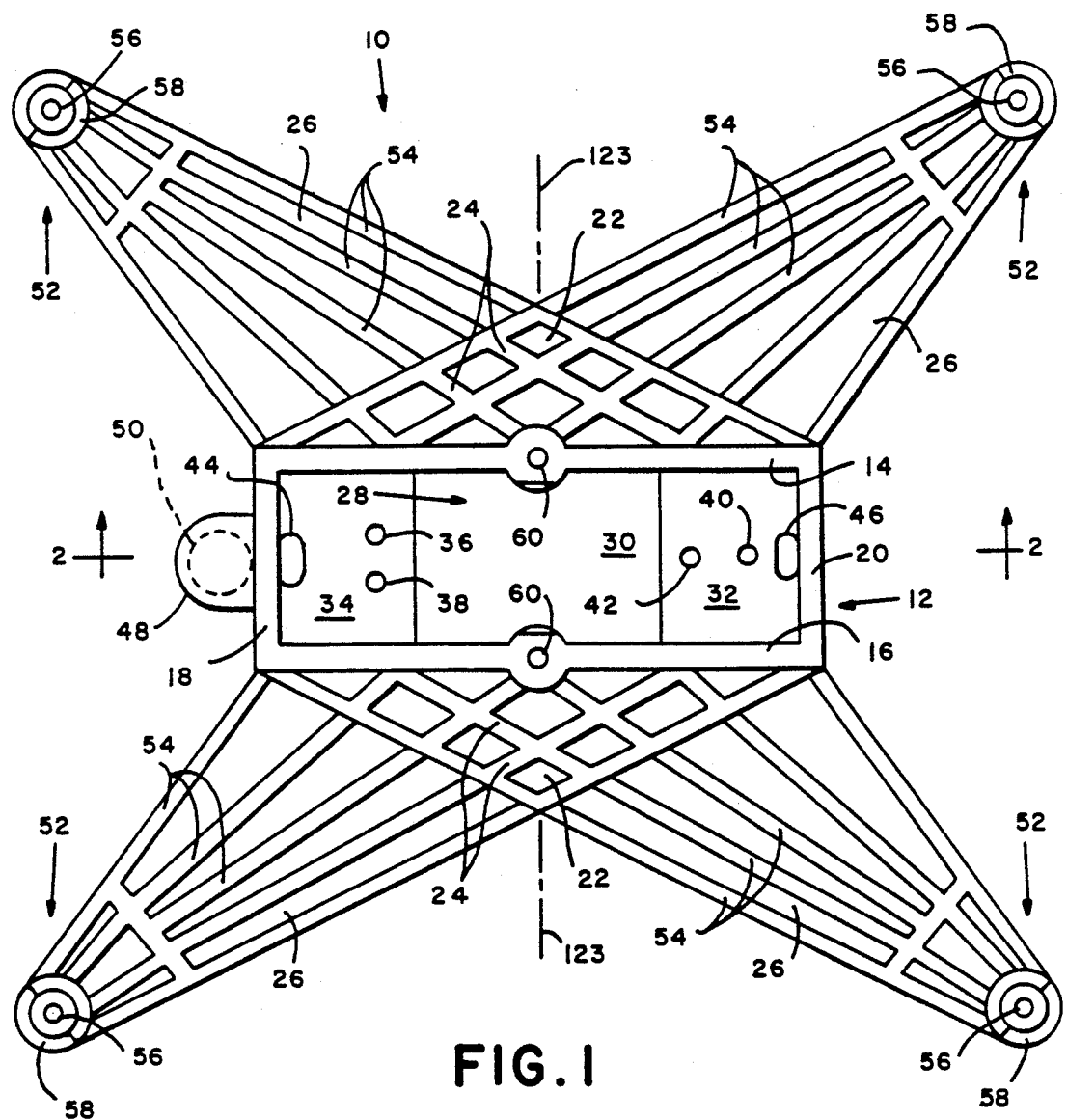
FIG. 1 is a plan view of a load cell supporting member that is used in the weighing cell of this invention.
Figure 2:
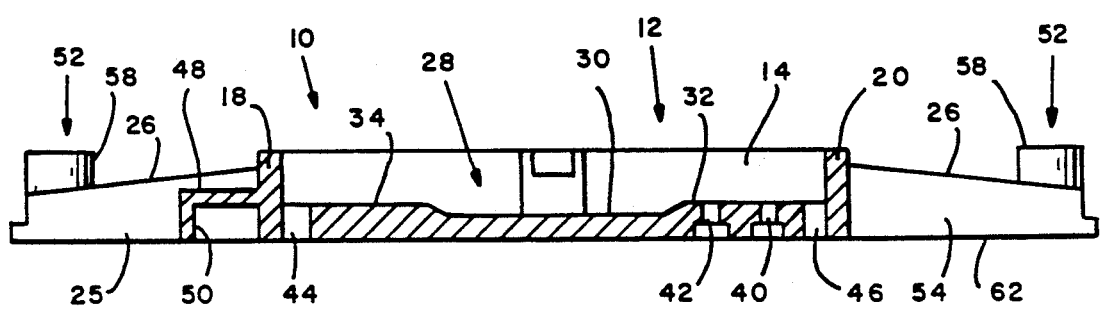
FIG. 2 is a sectional view taken on the line 2—2 of FIG. 1.

Referring to FIGS. 1 and 2, a load cell supporting member 10 includes generally rectangular central portion 12, which has long walls 14, 16 and short walls 18, 20. It will be noted that walls 14, 16, 18, 20 form a walled perimeter of central portion 12. Adjacent each of long walls 14, 16 is a triangular webbed portion 22 which includes webbing ridges 24. Two arms 26 extend from each webbed portion 22. The four arms 26 are arranged so as to extend radially from the center of central portion 12.

Central portion 12 includes a chamber 28 for receiving a load cell. Chamber 28 encompasses the space between walls 14, 16, 18, 20. The floor 30 of chamber 28 includes raised pads 32, 34. Pad 34 includes paired circular clearance holes 36, 38, and pad 32 includes paired circular clearance holes 40, 42. Elongate clearance holes 44, 46 are found respectively in pads 32, 34 and are respectively adjacent walls 18 and 20. Holes 36, 38, 40, 42, 44, 46 extend completely through floor 30 of chamber 28. As will be seen, circular holes 36, 38, or circular holes 40, 42, are for mounting a load cell to member 10. Elongate holes 44, 46 are to accommodate passage of electrical lead wires (not shown) from a load cell to scale electronics (not shown).

Receptacle 48 extends outwardly from wall 18 and includes cylindrical well 50. As indicated below, a leveling bubble may be installed in receptacle 48.

Each arm 26 has a distal end 52. Ribs 54 emerge from each webbed section 22 along the two arm 26 extending therefrom. The ribs 54 along each arm 26 converge at the distal end 52 of their respective arms 26. At least some of the ribs 54 are extensions of webbing ridges 24.

Each distal end 52 includes a tapped hole 56. Each distal end 52 also has a semicylindrical down stop member 58.

Midway between short walls 18, 20, both long walls 14, 16 includes reinforced tapped holes 60, which may receive downstop screws, as will be discussed.

It will be noted that, except for well 50 and the various holes discussed above, lower surface 62 of member 10 is uninterrupted, and substantially flat and smooth.

Member 10 is preferably a single, relatively strong and rigid, integral piece, such as an aluminum casting or alternatively, a plastic molding comprising, for instance, a glass-reinforced plastic.

Figure 3:
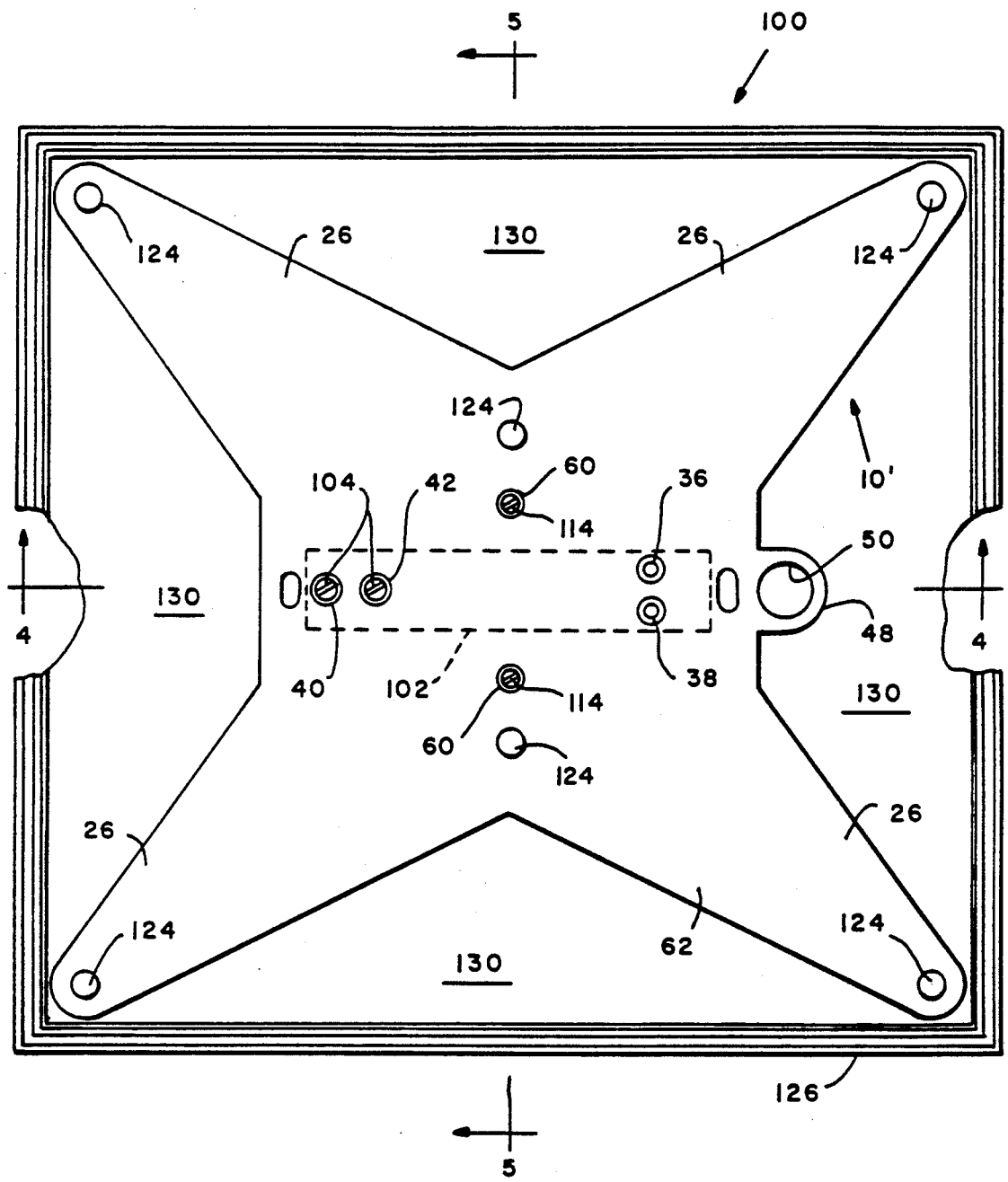
FIG. 3 is a plan view of the weighing cell (without platform) that incorporates the supporting member of FIG. 1.
Figure 4:
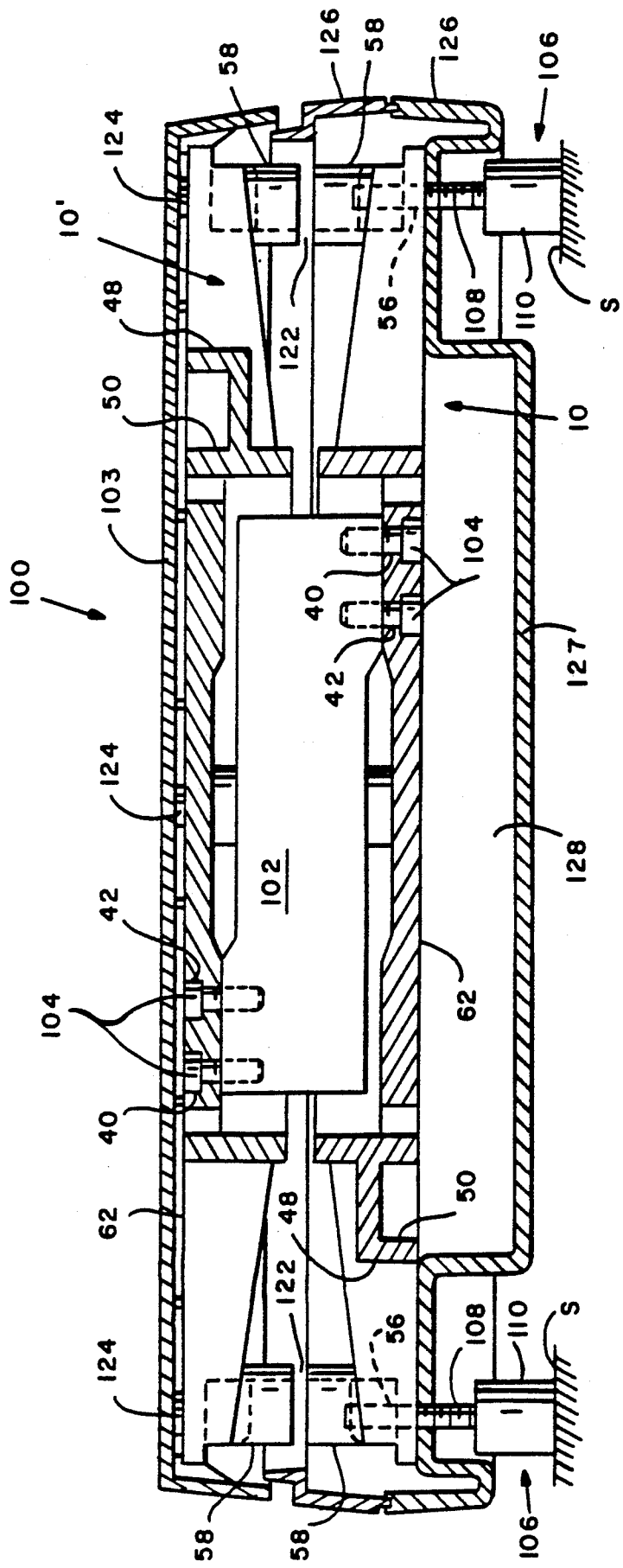
FIG. 4 is a sectional view of the weighing cell (with platform) of FIG. 3, taken on the line 4—4 of FIG. 3.
Figure 5:
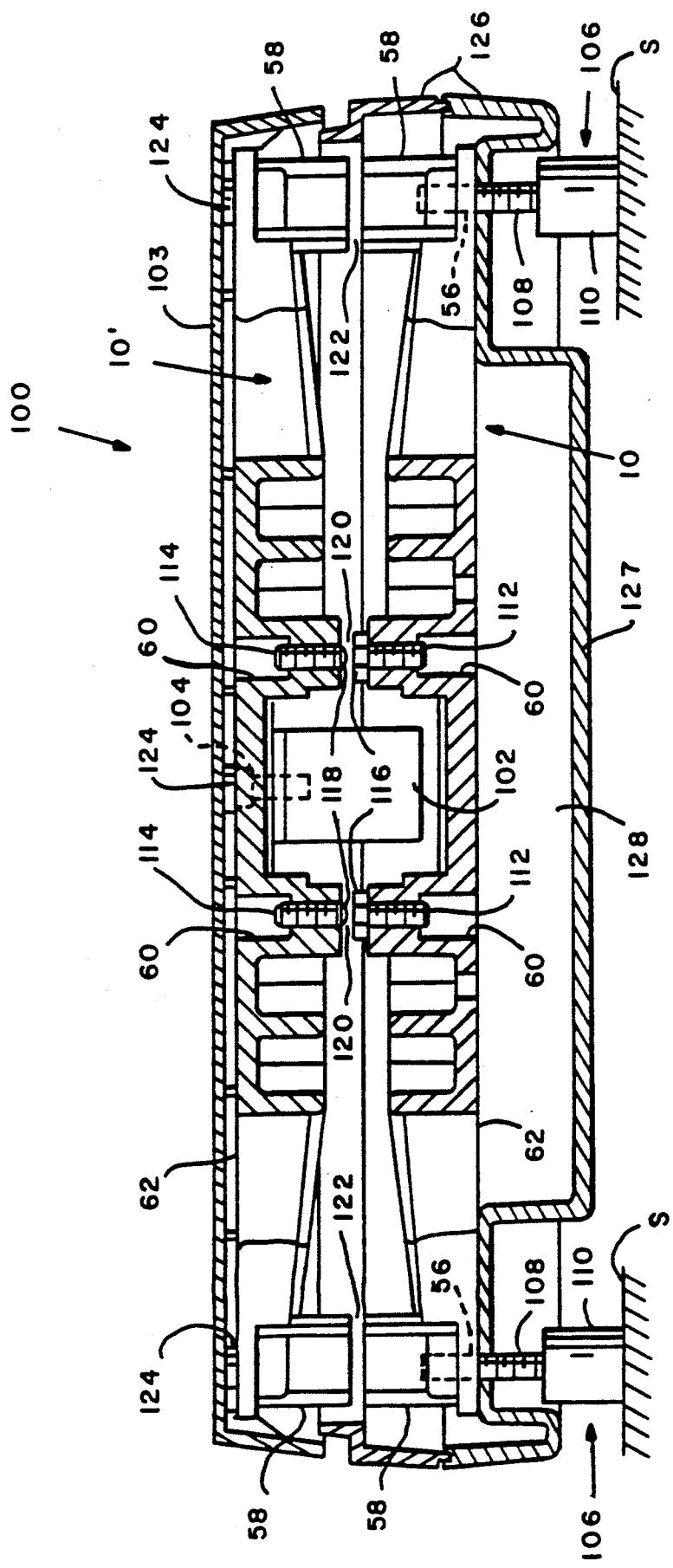
FIG. 5 is another sectional view of the weighing cell (with platform) of FIG. 3, taken on the line 5—5 of FIG. 3.

Referring to FIGS. 3, 4, 5, weighing scale 100 includes a load cell supporting member 10. Member 10 supports load cell 102. Load cell 102 supports platform supporting member 10', which is identical to member 10. Platform supporting member 10' supports platform 103 (FIGS. 4, 5; not shown in FIG. 3).

Load cell 102 is a conventional low profile load cell; its internal structure, including flexure members, strain gages and associated wiring, is well known to those skilled in the art and is not shown. The model PW 2C3 load cell available from Hottinger Baldwin Measurements, Inc., Marlboro, Mass. and the model 1040 load cell available from Tedea, Inc., Canoga Park, Calif. are two examples of a type of load cell that may be used in scale 100.

Load cell 102 is attached to members 10, 10' by fasteners 104 which pass through holes 40, 42 of members 10, 10'. Holes 36, 38 are not used in scale 100 as shown but are provided to permit use of load cells with mounting holes arranged in the same configuration as holes 36, 38.

Member 10 is supported on surface S by four adjustable legs 106, each of which includes a bolt portion 108 and a foot 110. Each bolt portion 108 is received in a hole 56 of member 10. The feet 110 comprise an energy absorbing material such as those discussed in above mentioned U.S. Pat. No. 4,479,561.

Received within each hole 60 of member 10 is a headed screw 112. Received within each hole 60 of member 10', is a set screw 114. Each headed screw 112 has a head 116 and each set screw 114 has a lower tip 118. Each head 116 is vertically displaced a small distance from a lower tip 118, thereby defining between each head 116 and the associated lower tip 118, a downstop gap 120. As will be well understood by those skilled in the art, if an excessive downward load or shock is applied to platform 103, one or both of set screws 114 will come into contact with their associated headed screws 112, thereby transmitting the load or shock directly to member 10 and preventing excessive flexure of load cell 102 which may damage load cell 102.

The walled perimeters, comprising walls 14, 16, 18, 20, and which include each reinforced hole 60, form a very rigid structure that aids in the transmission of loads, and particularly shock loads, to the downstop screws and away from load cell 102, thus protecting load cell 102. The width of downstop gaps 120 may be adjusted by methods that are familiar to those skilled in the art.

Four additional downstop gaps 122 are defined between the respective downstop members 58 of load cell supporting member 10 and platform supporting member 10'. Downstop members 58 provide additional protection to load cell 102 against excessive off-center loading upon platform 103.

In a preferred embodiment, downstop gaps 122 are ⅛ inch wide ±10%. The size of downstop gaps 122 is a function of the dimensions of members 10, 10', load cell 102 and any spacers (not shown) used intermediate member 10 and load cell 102 and/or intermediate load cell 102 and member 10'. Use of such spacers is well known in the art. It will be appreciated that the desired size of gaps 122 is easily obtained by appropriate dimensioning of member 10 and/or selection of load cell 102 or the aforesaid spacers. Referring to FIG. 1, it will be observed that member 10 is mirror-symmetric about the line 2—2 and also, disregarding receptacle 48, is mirror-symmetric about line 123. These symmetries of members 10, 10' result in a uniform size of gaps 122.

It will be noted that downstop gaps 120 are relatively close to the center of platform 103 and serve to control total vertical load, while allowing the corner downstop gaps 122 to limit off-center loading. Thus a large proportion of the load cell's capacity may be utilized before center downstop gaps 120 come into play.

As shown in FIG. 3, six pads 124 adhere to flat surface 62 of platform supporting member 10'. Platform 103 rests on pads 124 (FIGS. 4, 5). In a preferred embodiment, pads 124 are composed of an energy absorbing material such as that of feet 110.

As will be appreciated by those skilled in the art, load cell 102, feet 110 and pads 124 are all somewhat compliant and allow oscillations to occur in scale 100. Load cell 102, feet 110 and pads 124 will sometimes collectively be referred to as "the compliant elements" of scale 100. Further, load cell 102, members 10, 10', platform 103 and items mechanically coupled thereto shall sometimes be referred to as "the weighing cell".

It will be appreciated that member 10 serves as a base for the weighing cell, while member 10' serves as a supporting structure for platform 103.

As will also be understood by those skilled in the art, scale 10, as a system subject to oscillation, may be viewed as a mass-spring system. For analytic purposes, the mass in such a mass-spring system is equivalent to the combined mass of the weighing cell and a load placed upon platform 03. The spring in such a system is equivalent in its spring effect to a combination of the compliant elements. Thus, it may be said that the spring is equivalent in compliant effect to those compliant elements.

The aforesaid feet 110 are similar to those described in U.S. Pat. No. 4,479,561 and are selected, in shape, size and material, to substantially dampen the oscillation modes of a mass spring system consisting of a spring equivalent in its total compliant effect to the compliant elements of scale 100 and a mass equal to the combined mass of the heaviest object to be weighed and of the weighing cell.

Pads 24 are shaped and sized so as to provide efficient damping of the oscillation modes characteristic of a mass spring system comprising load cell 102, feet 110, pads 124, members 10, 10' and platform 103 and a relatively small load, which for example may be five or ten pounds, or may be five to twenty percent of the scale's intended full load. By way of example pads 124 may be composed of E-A-R Isodamp C-1002 as referred to in U.S. Pat. No. 4,479,561, and may be cylindrical in shape with a height of one-eighth inch and a diameter of one-quarter-inch. A pad of approximately the same volume but with a square or rectangular or other shaped cross-section, rather than a round cross-section, may also be used. Pads 124 are thus a second damping means chosen to substantially dampen the oscillations of a mass spring system consisting of a spring equivalent in total compliant effect to the compliant elements of scale 100, and a mass equal to the combined mass of a relatively light object to be weighed and of the weighing cell that comprises members 10, 10', load cell 102 and platform 103. A "relatively light object" will be understood to mean one having a mass that is substantially less than the mass of the heaviest object to be weighed; that is substantially less than the full rated load of scale 100. Use of such pads 124 improves the response time of scale 10 on the order of one-tenth of a second for such relatively light objects.

Well 50 of receptacles 48 of platform supporting member 10' is available to receive a conventional leveling bubble (not shown). Access may be had to the leveling bubble by lifting platform 103 up and away from member 10'. Receptacle 48 of load cell supporting member 10 is not used in scale 100.

Scale 100 also includes plastic casing 126 which has a bottom portion 127. Casing 126 may be snapped onto member 10 or mounted on member 10 by other conventional means. As shown in FIGS. 5, space 128 is defined within casing 126 and below member 10. Spaces 130 (FIG. 3) are defined within casing 126 and between arms 26 of members 10, 10'.

As will be appreciated by those skilled in the art, scale 100 also includes various electronic components and a power supply, as well as a communications interface to other devices and/or means for displaying weight information and/or a keyboard. All of these are conventional and are not shown in FIGS. 3, 4, 5. Spaces 130 and 128 are available for housing these items.

Advantages of this invention include the following:

(A) Use of members 10, 10' in scale 100 eliminates the use of many parts that are commonly used in the mechanical structure of a weighing scale. Thus the quantity and cost of tooling required to produce the scale is reduced as compared to prior designs. The quantity of inventory parts, and the cost of maintaining such inventory, is also reduced, as is the cost of assembling the scale.

(B) Loads placed upon platform 103, and the load resulting from the weight of members 10, 10' and load cell 102 are transmitted directly to ground through the legs 106. Therefore, casing 126 and particularly bottom portion 127 thereof, may be less strong and heavy than in prior art designs because the casing is not a structural component of the scale.

In addition shock loads are more efficiently transmitted to ground than in prior art designs and so have less effect on the electronic components of the scale.

Transmission of loads through corner downstop members 58 to ground is particularly efficient because feet 110 are substantially directly beneath downstop members 58.

Webbing ridges 24 and ribs 54 of member 10 aid in the efficient transmission of loads through distal ends 52 to legs 106 or to downstop members 58. Ridges 24 and ribs 54 also add to the stiffness of member 10, thus causing any vibrations of member 10 to be of relatively high frequency and so rapidly dissipated or damped.

(C) The mechanical structure of the scale, which essentially comprises members 10, 10', load cell 102 and legs 106, is modular and can be easily incorporated into a variety of scale designs, including a variety of configurations for the casing. The structure also is relatively low profile, allowing the total height of the scale to be relatively low.

Other advantages of the invention disclosed herein will be readily discerned by those skilled in the art. The disclosure of copending application Ser. No. 07/551,374, entitled "LOAD CELL SUPPORTING MEMBER AND WEIGHING SCALE INCORPORATING THE SAME" is incorporated herein by reference.

The members 10, 10', shown and described above are identical; that is, members 10, 10' are of the same size, shape and material and are interchangeable for all purposes, and thus may be identified for manufacturing and inventory purposes by a single part number. However, it is also within the contemplation of this invention that members 10, 10', may vary in minor respects, e.g., by the addition or elimination of some holes or of a leveling bubble receptacle, or by substitution of a clearance hole for a tapped hole or vice versa, or by the material or materials of which they are composed.

It will be appreciated that, depending on the dimensions of the load cell to be used in scale 100, and the desired distance between members 10, 10', it may be necessary to use spacers in securing the load cell to the supporting members. Use of such spacers is well known to those skilled in the art.

While preferred embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A weighing cell for determining the weight of an object, comprising:
   (a) a base;
   (b) first damping means operatively positioned between said base and a mechanical ground;
   (c) a load cell supported by said base;
   (d) means for supporting a platform, said platform supporting means being supported by said load cell;
   (e) a platform for supporting such object, said platform being supported by said platform supporting means; and
   (f) second damping means operatively positioned between said platform and said platform supporting means;
   wherein said first damping means is chosen to substantially dampen the oscillations of a mass spring system consisting of a spring equivalent in compliant effect to said load cell, said first damping means and said second damping means and a mass equal to the combined mass of the heaviest object to be weighed and of the weighing cell and said second damping means is chosen to substantially dampen the oscillations of a mass spring system consisting of a spring equivalent in compliant effect to said load cell, said first damping means and said second damping means and a mass equal to the combined mass of the weighing cell and of an object having a mass that is substantially less than the mass of said heaviest object.

2. The weighing cell of claim 1, wherein said second damping means comprises at least one pad, said pad being composed of an energy absorbing material.

3. The weighing cell of claim 2, wherein said base comprises a plurality of feet and said first damping means comprises energy absorbing material attached to said feet.

4. The weighing cell of claim 3, wherein said mass that is substantially less than the mass of said heaviest object is one-tenth of the mass of said heaviest object.

5. The weighing cell of claim 3, wherein said mass that is substantially less than the mass of said heaviest object in one-twentieth of the mass of said heaviest object.

6. The weighing cell of claim 3, wherein said mass that is substantially less than the mass of said heaviest object in one-fifth of the mass of said heaviest object.

7. The weighing cell of claim 3, wherein said base and said platform supporting means each comprise a supporting member, said supporting members being substantially identical.

8. The weighing cell of claim 7, wherein each said supporting member comprises a plurality of ribs, said ribs causing said member to be relatively stiff.

9. The weighing cell of claim 7, wherein each said supporting member comprises a central portion and a plurality of radially extending arms.

* * * * *